US009622257B2

(12) United States Patent
Terry et al.

(10) Patent No.: US 9,622,257 B2
(45) Date of Patent: *Apr. 11, 2017

(54) PRIORITIZATION OF RETRANSMISSION OF PROTOCOL DATA UNITS TO ASSIST RADIO LINK CONTROL RETRANSMISSION

(71) Applicant: InterDigital Technology Corporation, Wilmington, DE (US)

(72) Inventors: Stephen E. Terry, Northport, NY (US); Yi-Ju Chao, Minnetonka, MN (US); James M. Miller, Verona, NJ (US)

(73) Assignee: Interdigital Technology Corporation, Wilmington, DE (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/523,348

(22) Filed: Oct. 24, 2014

(65) Prior Publication Data

US 2015/0043507 A1    Feb. 12, 2015

Related U.S. Application Data

(63) Continuation of application No. 14/049,710, filed on Oct. 9, 2013, now Pat. No. 8,929,385, which is a
(Continued)

(51) Int. Cl.
*H04L 12/28* (2006.01)
*H04L 1/18* (2006.01)
(Continued)

(52) U.S. Cl.
CPC .............. *H04W 72/10* (2013.01); *H04L 1/08* (2013.01); *H04L 1/1812* (2013.01);
(Continued)

(58) Field of Classification Search
CPC .... H04W 28/0242; H04L 1/16; H04L 1/1812; H04L 1/1874; H04L 1/1887
(Continued)

(56) References Cited

U.S. PATENT DOCUMENTS 4,594,591 A   6/1986  Burke
5,313,579 A   5/1994  Chao
(Continued)

FOREIGN PATENT DOCUMENTS

EP    1006689    11/1999
EP    1225735    7/2002
(Continued)

OTHER PUBLICATIONS

3GPP, "3rd Generation Partnership Project; Technical Specification Group Radio Access Network; High Speed Downlink Packet Access; Overall UTRAN Description (Release 5)," 3GPP TR 25.855 V5.0.0 (Sep. 2001).
(Continued)

*Primary Examiner* — Thjuan K Addy
(74) *Attorney, Agent, or Firm* — Volpe and Koenig, P.C.

(57) ABSTRACT

The transmission and retransmission of radio link control (RLC) data protocol data units (PDUs) is managed by user equipment (UE). An indication is received, by the UE, that an RLC data PDU was not received by a receiving device. The RLC data PDU, that was not received, is retransmitted and prioritized over other RLC data PDUs. A number of times that the RLC data PDU was retransmitted is tracked by the UE.

22 Claims, 6 Drawing Sheets

Related U.S. Application Data continuation of application No. 13/283,105, filed on Oct. 27, 2011, now Pat. No. 8,565,241, which is a continuation of application No. 12/783,863, filed on May 20, 2010, now Pat. No. 8,068,497, which is a continuation of application No. 10/434,615, filed on May 9, 2003, now Pat. No. 7,724,749.

(60) Provisional application No. 60/379,829, filed on May 10, 2002.

(51) Int. Cl.
    H04W 72/10    (2009.01)
    H04W 28/02    (2009.01)
    H04L 1/08     (2006.01)
    H04W 24/02    (2009.01)
    H04L 1/16     (2006.01)

(52) U.S. Cl.
    CPC .......... H04L 1/1874 (2013.01); H04L 1/1887 (2013.01); H04W 24/02 (2013.01); H04W 28/0242 (2013.01); H04L 1/16 (2013.01)

(58) Field of Classification Search
    USPC ............. 370/395.4, 329, 331, 349, 395.42; 455/512; 714/748, 749, 776
    See application file for complete search history.

(56) References Cited

U.S. PATENT DOCUMENTS

| | | | |
|---|---|---|---|
| 5,548,739 | A | 8/1996 | Yung |
| 5,623,602 | A | 4/1997 | Nakashima |
| 5,684,791 | A | 11/1997 | Raychaudhuri et al. |
| 5,764,646 | A | 6/1998 | Dent |
| 5,884,171 | A | 3/1999 | Tanabe et al. |
| 5,930,525 | A | 7/1999 | Gotesman et al. |
| 6,115,390 | A | 9/2000 | Chuah |
| 6,208,620 | B1 | 3/2001 | Sen et al. |
| 6,226,301 | B1 | 5/2001 | Cheng et al. |
| 6,330,247 | B1 | 12/2001 | Chang et al. |
| 6,363,058 | B1 | 3/2002 | Roobol et al. |
| 6,434,367 | B1 | 8/2002 | Kumar et al. |
| 6,469,992 | B1 | 10/2002 | Schieder |
| 6,606,327 | B1 * | 8/2003 | Lowe .............. H04L 12/4015 370/448 |
| 6,614,790 | B1 | 9/2003 | Veres et al. |
| 6,625,128 | B1 | 9/2003 | Bharath et al. |
| 6,731,623 | B2 | 5/2004 | Lee et al. |
| 6,744,743 | B2 | 6/2004 | Walton et al. |
| 6,895,010 | B1 | 5/2005 | Chang et al. |
| 6,981,047 | B2 | 12/2005 | Hanson et al. |
| 7,051,226 | B1 | 5/2006 | Lowe et al. |
| 7,079,489 | B2 | 7/2006 | Massie et al. |
| 7,114,002 | B1 | 9/2006 | Okumura et al. |
| 7,180,896 | B1 | 2/2007 | Okumura |
| 2001/0036810 | A1 | 11/2001 | Larsen |
| 2002/0042270 | A1 | 4/2002 | Yi et al. |
| 2002/0071407 | A1 | 6/2002 | Koo et al. |
| 2002/0075941 | A1 | 6/2002 | Souissi et al. |
| 2002/0154612 | A1 | 10/2002 | Massie et al. |
| 2003/0043764 | A1 | 3/2003 | Kim et al. |
| 2003/0067890 | A1 | 4/2003 | Goel et al. |
| 2003/0099305 | A1 | 5/2003 | Yi et al. |
| 2003/0147348 | A1 | 8/2003 | Jiang |
| 2003/0152083 | A1 | 8/2003 | Nagata et al. |
| 2003/0191844 | A1 | 10/2003 | Meyer et al. |
| 2005/0002352 | A1 | 1/2005 | Bao et al. |

FOREIGN PATENT DOCUMENTS

| | | |
|---|---|---|
| JP | 63-257350 | 10/1988 |
| JP | 06-112953 | 4/1994 |
| JP | 09-55776 | 2/1997 |
| JP | 09-181770 A2 | 7/1997 |
| JP | 10-084335 | 3/1998 |
| JP | 10-112737 | 4/1998 |
| JP | 11-215192 | 8/1999 |
| JP | 2000-151623 | 5/2000 |
| JP | 2000-236343 | 8/2000 |
| JP | 2000-354065 | 12/2000 |
| JP | 2001-036578 | 2/2001 |
| JP | 2001-119437 | 4/2001 |
| JP | 2001-127830 | 5/2001 |
| JP | 2001-320417 | 11/2001 |
| WO | 01/80477 | 10/2001 |
| WO | 02/05496 | 1/2002 |
| WO | 03/036844 | 5/2003 |

OTHER PUBLICATIONS

Huawei Technologies Co., LTD/CWTS, "Add MAC PDUs retransmission function in MAC-HS," 3GPP TSG-RAN WG2 meeting #24, R2-012310 (Oct. 22-26, 2001).

3GPP, "3$^{rd}$ Generation Partnership Project; Technical Specification Group Radio Access Network; High Speed Downlink Packet Access (HSDPA); Overall description; Stage 2 (Release 5)," 3GPP TS 25.308 V5.4.0 (Mar. 2003).

3GPP, "3$^{rd}$ Generation Partnership Project; Technical Specification Group Radio Access Network; Medium Access Control (MAC) protocol specification (Release 4)," 3GPP TS 25.321 V4.8.0 (Mar. 2003).

3GPP, "3$^{rd}$ Generation Partnership Project; Technical Specification Group Radio Access Network; Medium Access Control (MAC) protocol specification (Release 4)," 3GPP TS 25.321 V4.4.0 (Mar. 2002).

3GPP, "3$^{rd}$ Generation Partnership Project; Technical Specification Group Radio Access Network; Medium Access Control (MAC) protocol specification (Release 1999)," 3GPP TS 25.321 V3.15.0 (Mar. 2003).

3GPP, "3$^{rd}$ Generation Partnership Project; Technical Specification Group Radio Access Network; Medium Access Control (MAC) protocol specification (Release 1999)," 3GPP TS 25.321 V3.11.0 (Mar. 2002).

3GPP, "3$^{rd}$ Generation Partnership Project; Technical Specification Group Radio Access Network; Medium Access Control (MAC) protocol specification (Release 5)," 3GPP TS 25.321 V5.0.0 (Mar. 2002).

3GPP, "3$^{rd}$ Generation Partnership Project; Technical Specification Group Radio Access Network; Medium Access Control (MAC) protocol specification (Release 5)," 3GPP TS 25.321 V5.4.0 (Mar. 2003).

3GPP, "3$^{rd}$ Generation Partnership Project; Technical Specification Group Radio Access Network; High Speed Downlink Packet Access (HSDPA); Overall description; Stage 2 (Release 5)," 3GPP TS 25.308 V5.2.0 (Mar. 2002).

3GPP, "3$^{rd}$ Generation Partnership Project; Technical Specification Group Radio Access Network; Multiplexing and channel coding (FDD) (Release 5)," 3GPP TS 25.212 V5.0.0 (Mar. 2002).

3GPP, "3$^{rd}$ Generation Partnership Project; Technical Specification Group Radio Access Network; Multiplexing and channel coding (FDD) (Release 4)," 3GPP TS 25.212 V4.6.0 (Sep. 2002).

3GPP, "3$^{rd}$ Generation Partnership Project; Technical Specification Group Radio Access Network; Multiplexing and channel coding (FDD) (Release 4)," 3GPP TS 25.212 V4.4.0 (Mar. 2002).

3GPP, "3$^{rd}$ Generation Partnership Project; Technical Specification Group Radio Access Network; Multiplexing and channel coding (FDD) (Release 1999)," 3GPP TS 25.212 V3.9.0 (Mar. 2002).

3GPP, "3$^{rd}$ Generation Partnership Project; Technical Specification Group Radio Access Network; Multiplexing and channel coding (FDD) (Release 1999)," 3GPP TS 25.212 V3.11.0 (Sep. 2002).

Chang et al., "End-to-end Delay of an Adaptive Selective Repeat ARQ Protocol," IEEE Transactions on Communications, vol. 42, No. 11, pp. 2926-2928 (Nov. 1994).

Khan et al., "Link layer buffer size distributions for HTTP and FTP applications in an IS-2000 system", Vehicular Technology Conference, 2000. IEEE VTS Fall VTC 2000. 52$^{nd}$ Sep. 24-28, 2000, Piscataway, NJ, USA, IEEE.

(56) References Cited

OTHER PUBLICATIONS

Siemens, Handling of Multiple Transport Channels in HSDPA, 3GPP TSG-RAN Working Group1 #21 R1-01-0855 (Aug. 27, 2001).

Siemens AG, Priority Handling and HSDPA MAC Architecture, 3GPP TSG-RAN WG2 Meeting #24 R2-012354 (Oct. 22, 2001).

3GPP, "3rd Generation Partnership Project; Technical Specification Group Radio Access Network; Radio Link Control (RLC) protocol specification (Release 1999)," 3GPP TS 25.322 V3.10.0 (Mar. 2002).

3GPP, "3rd Generation Partnership Project; Technical Specification Group Radio Access Network; Radio Link Control (RLC) protocol specification (Release 1999)," 3GPP TS 25.322 V3.14.0 (Mar. 2003).

3GPP, "3rd Generation Partnership Project; Technical Specification Group Radio Access Network; Radio Link Control (RLC) protocol specification (Release 4)," 3GPP TS 25.322 V4.4.0 (Mar. 2002).

3GPP, "3rd Generation Partnership Project; Technical Specification Group Radio Access Network; Radio Link Control (RLC) protocol specification (Release 4)," 3GPP TS 25.322 V4.8.0 (Mar. 2003).

3GPP, "3rd Generation Partnership Project; Technical Specification Group Radio Access Network; Radio Link Control (RLC) protocol specification (Release 5)," 3GPP TS 25.322 V5.0.0 (Mar. 2002).

3GPP, "3rd Generation Partnership Project; Technical Specification Group Radio Access Network; Radio Link Control (RLC) protocol specification (Release 5)," 3GPP TS 25.322 V5.4.0 (Mar. 2003).

Panasonic et al., "Modification of SDU Discard Function," TSG-RAN Working Group 2 (Radio layer 2 and Radio layer 3), TSGR2#8(99)f26, Cheju (Nov. 2-5, 1999).

Third Generation Partnership Project, "Technical Specification Group Services and System Aspects; Vocabulary for 3GPP Specifications (Release 1999)," 3G TR 21.905 V3.3.0 (Oct. 2001).

Third Generation Partnership Project, "Technical Specification Group Services and System Aspects; Vocabulary for 3GPP Specifications (Release 4)," 3GPP TR 21.905 V4.4.0 (Oct. 2001).

Third Generation Partnership Project, "Technical Specification Group Services and System Aspects; Vocabulary for 3GPP Specifications (Release 5)," 3GPP TR 21.905 V5.3.0 (Mar. 2002).

Third Generation Partnership Project, "Technical Specification Group Services and System Aspects; Vocabulary for 3GPP Specifications (Release 5)," 3GPP TR 21.905 V5.6.0 (Mar. 2003).

Third Generation Partnership Project, "Technical Specification Group Services and System Aspects; Vocabulary for 3GPP Specifications (Release 6)," 3GPP TR 21.905 V6.2.0 (Mar. 2003).

* cited by examiner

DSCH PDU TRANSMISSION PRIORITY SCHEDULING

PRIORITIZATION OF RETRANSMISSION OF PROTOCOL DATA UNITS TO ASSIST RADIO LINK CONTROL RETRANSMISSION

CROSS REFERENCE TO RELATED APPLICATIONS

This application is a continuation of U.S. patent application Ser. No. 14/049,710 filed Oct. 9, 2013, which is a continuation of U.S. patent application Ser. No. 13/283,105 filed Oct. 27, 2011, which issued as U.S. Pat. No. 8,565,241 on Oct. 22, 2013, which is a continuation of U.S. patent application Ser. No. 12/783,863 filed May 20, 2010, which issued as U.S. Pat. No. 8,068,497 on Nov. 29, 2011, which is a continuation of U.S. patent application Ser. No. 10/434,615 filed May 9, 2003, which issued as U.S. Pat. No. 7,724,749 on May 25, 2010, which claims the benefit of U.S. Provisional Application Ser. No. 60/379,829 filed May 10, 2002, the contents of which are hereby incorporated by reference herein.

FIELD OF THE INVENTION

The present invention relates to the field of wireless communications. More specifically, the present invention relates to a system and method for prioritizing the retransmission of protocol data units (PDUs) to assist radio link control (RLC) layer retransmission.

BACKGROUND

In third generation (3G) cellular systems for Frequency Division Duplex (FDD) and Time Division Duplex (TDD), there are retransmission mechanisms in the Acknowledgement Mode of the Radio Link Control (RLC) layer to achieve high reliability of end-to-end data transmissions. The RLC layer is a peer entity in both the Radio Network Controller (RNC) and the User Equipment (UE).

A block diagram of a UMTS Terrestrial Radio Access Network (UTRAN) MAC-hs layer architecture is illustrated in FIG. 1, and a block diagram of the user equipment (UE) MAC-hs architecture is shown in FIG. 2. The architecture shown in FIGS. 1 and 2 is described in detail co-pending U.S. patent application Ser. No. 10/270,822 filed on Oct. 15, 2002 which is assigned to the present assignee. The UTRAN MAC-hs 30 shown in FIG. 1 comprises a transport format resource indicator (TFRI) selector 31, a scheduling and prioritization entity 32, a plurality of Hybrid Automatic Repeat (H-ARQ) processors 33a, 33b, a flow controller 34 and a priority class and transmission sequence number (TSN) setting entity 35.

The UE MAC-hs 40 comprises an H-ARQ processor 41. As will be explained with reference to both FIGS. 1 and 2, the H-ARQ processors 33a, 33b in the UTRAN MAC-hs 30 and the H-ARQ processor 41 in the UE MAC-hs 40 work together to process blocks of data.

The H-ARQ processors 33a, 33b in the UTRAN MAC-hs 30 handle all of the tasks that are required for the H-ARQ process to generate transmissions and retransmissions for any transmission that is in error. The H-ARQ processor 41 in the UE MAC-hs 40 is responsible for generating an acknowledgement (ACK) to indicate a successful transmission, and for generating a negative acknowledgement (NACK) to indicate a failed transmission. The H-ARQ processors 33a, 33b and 41 process sequential data streams for each user data flow.

As will be described in further detail hereinafter, blocks of data received on each user data flow are assigned to H-ARQ processors 33a, 33b. Each H-ARQ processor 33a, 33b initiates a transmission, and in the case of an error, the H-ARQ processor 41 requests a retransmission. On subsequent transmissions, the modulation and coding rate may be changed in order to ensure a successful transmission. The data block to be retransmitted and any new transmissions to the UE are provided by the scheduling and prioritization entity 32 to the H-ARQ entities 33a, 33b.

The scheduling and prioritization entity 32 functions as radio resource manager and determines transmission latency in order to support the required QoS. Based on the outputs of the H-ARQ processors 33a, 33b and the priority of a new data block being transmitted, the scheduling and prioritization entity 32 forwards the data block to the TFRI selector 31.

The TFRI selector 31, coupled to the scheduling and prioritization entity 32, receives the data block to be transmitted and selects an appropriate dynamic transport format for the data block to be transmitted. With respect to H-ARQ transmissions and retransmissions, the TFRI selector 31 determines modulation and coding.

It is highly desirable for the retransmitted data blocks to arrive at the RLC entity of the receiving side (i.e., the UE) as soon as possible for several reasons. First, the missed data block will prevent subsequent data blocks from being forwarded to higher layers, due to the requirement of in-sequence delivery. Second, the buffer of the UE needs to be sized large enough to accommodate the latency of retransmissions while still maintaining effective data rates. The longer the latency is, the larger the UE buffer size has to be to allow for the UE to buffer both the data blocks that are held up and continuous data receptions until the correct sequence data block is forwarded to higher layers. The larger buffer size results in increased hardware costs for UEs. This is very undesirable.

Referring to FIG. 3, a simplified flow diagram of the data flow between a Node B (shown at the bottom of FIG. 3) and a UE (shown at the top of FIG. 3) is shown. PDUs from higher level processing are scheduled and may be multiplexed into one data block. A data block can only contain PDUs of higher layers of the same priority. A unique TSN is assigned to each data block by the scheduler. The higher layers may provide a plurality of streams of different priorities of PDUs, each priority having a sequence of TSNs. The scheduler then dispatches the data blocks to the plurality of H-ARQ processors $P1_B$-$P5_B$. Each H-ARQ processor $P1_B$-$P5_B$ is responsible for processing a single data block at a time. For example, as shown in FIG. 3, the Priority 1 PDUs comprise a sequence illustrated as $B1_1$-$B1_N$. Likewise, the Priority 2 PDUs are sequenced from $B2_1$-$B2_N$ and the Priority 3 PDUs are sequenced from $B3_1$-$B3_N$. These PDUs are scheduled (and may be multiplexed) and affixed a TSN by the common scheduler. For purposes of describing the invention, it is assumed that one PDU equals one data block. After a data block is scheduled to be processed by a particular processor $P1_B$-$P5_B$, each data block is associated with a processor identifier, which identifies the processor $P1_B$-$P5_B$ that processes the data block.

The data blocks are then input into the scheduled Node B H-ARQ processors $P1_B$-$P5_B$ which receive and process each data block. Each Node B H-ARQ processor $P1_B$-$P5_B$ corresponds to an H-ARQ processor $P1_{UE}$-$P5_{UE}$ within the UE. Accordingly, the first H-ARQ processor $P1_B$ in the Node B communicates with the first H-ARQ processor $P1_{UE}$ in the UE. Likewise, the second H-ARQ processor $P2_B$ in the Node B communicates with the second H-ARQ processor $P2_{UE}$ in the UE, and so on for the remaining H-ARQ processors $P3_B$-$P5_B$ in the Node B and their counterpart H-ARQ processors $P3_{UE}$-$P5_{UE}$ respectively within the UE. The H-ARQ processes are timely multiplexed onto the air interface and there is only one transmission of an H-ARQ on the air interface at one time.

For example, taking the first pair of communicating H-ARQ processors $P1_B$ and $P1_{UE}$, the H-ARQ processor $P1_B$ processes a data block, for example $B1_1$, and forwards it for multiplexing and transmitting it over the air interface. When this data block $B1_1$ is received by the first H-ARQ processor $P1_{UE}$, the processor $P1_{UE}$ determines whether or not it was received without error. If the data block $B1_1$ was received without error, the first H-ARQ processor $P1_{UE}$ transmits an ACK to indicate to the transmitting H-ARQ processor $P1_B$ that it has been successfully received. On the contrary, if there is an error in the received data block $B1_1$, the receiving H-ARQ processor $P1_{UE}$ transmits a NACK to the transmitting H-ARQ processor $P1_B$. This process continues until the transmitting processor $P1_B$ receives an ACK for the data block $B1_1$. Once an ACK is received, that processor $P1_B$ is "released" for processing another data block. The scheduler will assign the processor $P1_B$ another data block if available, and can choose to retransmit or start a new transmission at any time.

Once the receiving H-ARQ processors $P1_{UE}$-$P5_{UE}$ process each data block, they are forwarded to the reordering buffers $R_1$, $R_2$, $R_3$ based on their priority; one reordering buffer for each priority level of data. For example, Priority 1 data blocks $B1_1$-$B1_N$ will be received and reordered in the Priority 1 reordering buffer $R_1$; Priority 2 data blocks $B2_1$-$B2_N$ will be received and reordered in the Priority 2 reordering buffer $R_2$; and the Priority 3 data blocks $B3_1$-$B3_N$ will be received and reordered by the Priority 3 reordering buffer $R_3$.

Due to the pre-processing of the data blocks by the receiving H-ARQ processors $P1_{UE}$-$P5_{UE}$ and the ACK/NACK acknowledgement procedure, the data blocks are often received in an order that is not sequential with respect to their TSNs. The reordering buffers $R_1$-$R_3$ receive the out-of-sequence data blocks and attempt to reorder the data blocks in a sequential manner prior to forwarding onto the RLC layer. For example, the Priority 1 reordering buffer $R_1$ receives and reorders the first four Priority 1 data blocks $B1_1$-$B1_4$. As the data blocks are received and reordered, they will be passed to the RLC layer.

On the receiving side, the UE MAC-hs, (which has been graphically illustrated as MAC-hs control), reads the H-ARQ processor ID, whether it is sent on a control channel such as the HS-SCCH or whether the data block has been tagged, to determine which H-ARQ processor $P1_{UE}$-$P5_{UE}$ has been used. If the UE receives another data block to be processed by the same H-ARQ processor $P1_{UE}$-$P5_{UE}$, the UE knows that that particular H-ARQ processor $P1_{UE}$-$P5_{UE}$ has been released regardless of whether or not the previous data block processed by that H-ARQ processor $P1_{UE}$-$P5_{UE}$ has been successfully received or not.

FIG. 4 is an example of a prior art system including an RNC, a Node B, a UE and their associated buffers. This example assumes that the UE is the receiving entity and the Node B is the transmitting entity. In this prior art system, a PDU with SN=3 is not received successfully by the UE. Therefore, the RLC in the UE requests its peer RLC layer in the RNC for a retransmission. Meanwhile, the PDUs with SNs=6-9 are buffered in the Node B, and PDUs with SNs=4 and 5 are buffered in the UE. It should be noted that although FIG. 4 shows only several PDUs being buffered, in reality many more PDUs (such as 100 or more) and PDUs from other RLC entities may be buffered.

As shown in FIG. 5, if a retransmission of the PDU with SN=3 is required, it must wait at the end of the queue in the Node B buffer, and will be transmitted only after the PDUs with SNs=6-9 are transmitted. The PDUs in the UE cannot be forwarded to the upper layers until all PDUs are received in sequence.

In this case, the PDU with SN=3 stalls the forwarding of subsequent PDUs to higher layers, (i.e. SNs=4-9), assuming all the PDUs are transmitted successfully. Again, it should be noted that this example only reflects 11 PDUs, whereas in normal operation hundreds of PDUs may be scheduled in advance of retransmitted data PDUs, which further aggravates transmission latency and data buffering issues.

It would be desirable to have a system and method whereby the retransmitted data can avoid the delays due to congestion in the transmission buffers.

SUMMARY

The present invention is a system and method for transferring data in a wireless communication system. A plurality of data blocks are received and temporarily stored in a first memory. The plurality of data blocks are then transmitted. A determination is then made as to whether each of the transmitted data blocks was received successfully or needs to be retransmitted because the data block was not received successfully. Each of the transmitted data blocks that needs to be retransmitted is marked and stored in a second memory having a higher priority than the first memory. The marked data blocks stored in the second memory are transmitted before transmitting data blocks stored in the first memory.

Each marked data block may include a common channel priority indicator (CmCH-Pi). The CmCH-Pi of the marked data block is read and used to determine which of a plurality of memories to place the marked data block in based on the CmCH-Pi.

In accordance with one preferred embodiment of the present invention, a wireless communication system for transferring data includes a UE, a Node B in communication with the UE and a radio network controller (RNC) in communication with the Node B and the UE. The RNC transmits a plurality of data blocks to the UE via the Node B. The UE sends a status report to the RNC. The report indicates whether each of the transmitted data blocks was received successfully by the UE or needs to be retransmitted because the data block was not received successfully by the UE. The RNC marks each of the data blocks that needs to be retransmitted and sends the marked data blocks to the Node B. The Node B receives, temporarily stores and prioritizes transmission of the marked data blocks over other data blocks previously received and stored in Node B. The Node B transmits the marked data blocks to the UE before the other data blocks.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
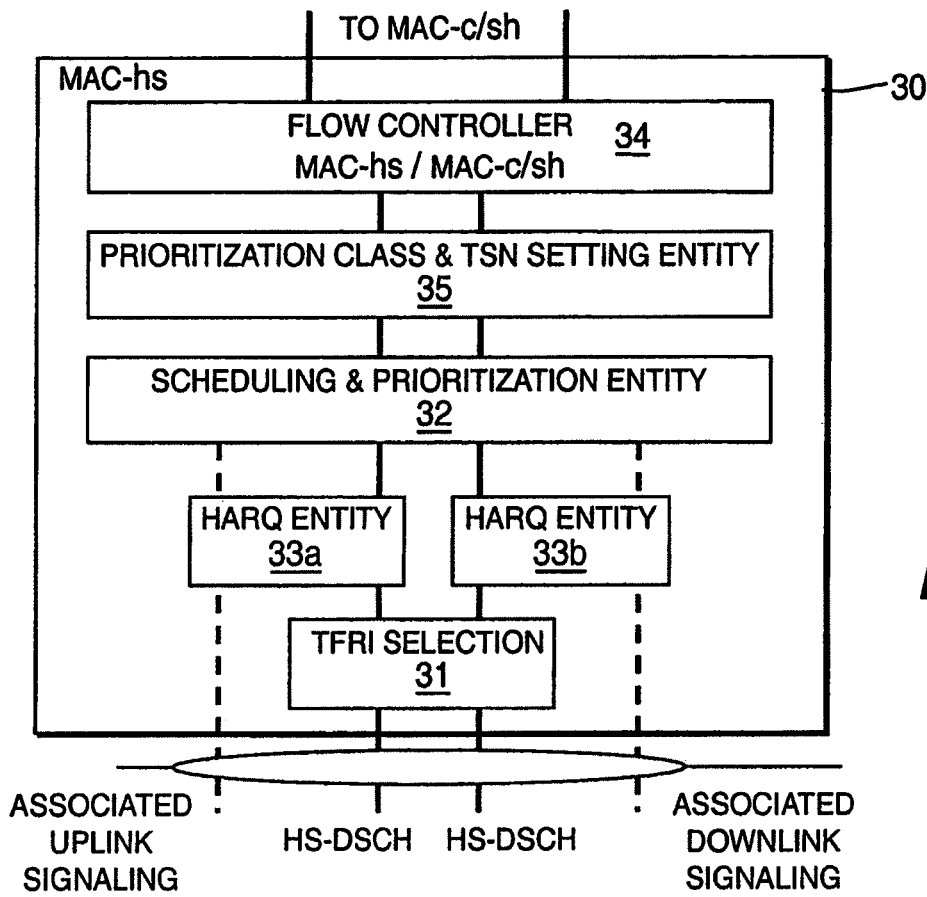
FIG. 1 is a UTRAN MAC-hs.
Figure 2:
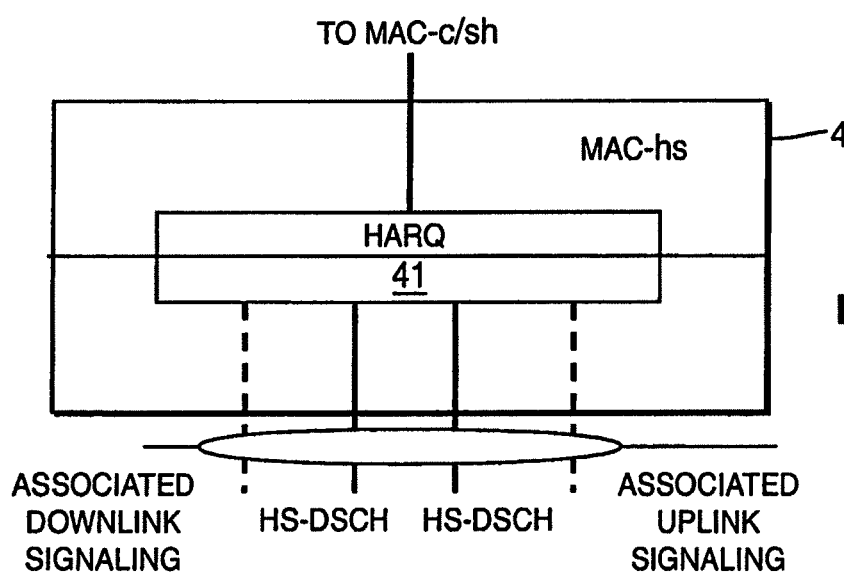
FIG. 2 is a prior art UE MAC-hs.
Figure 3:
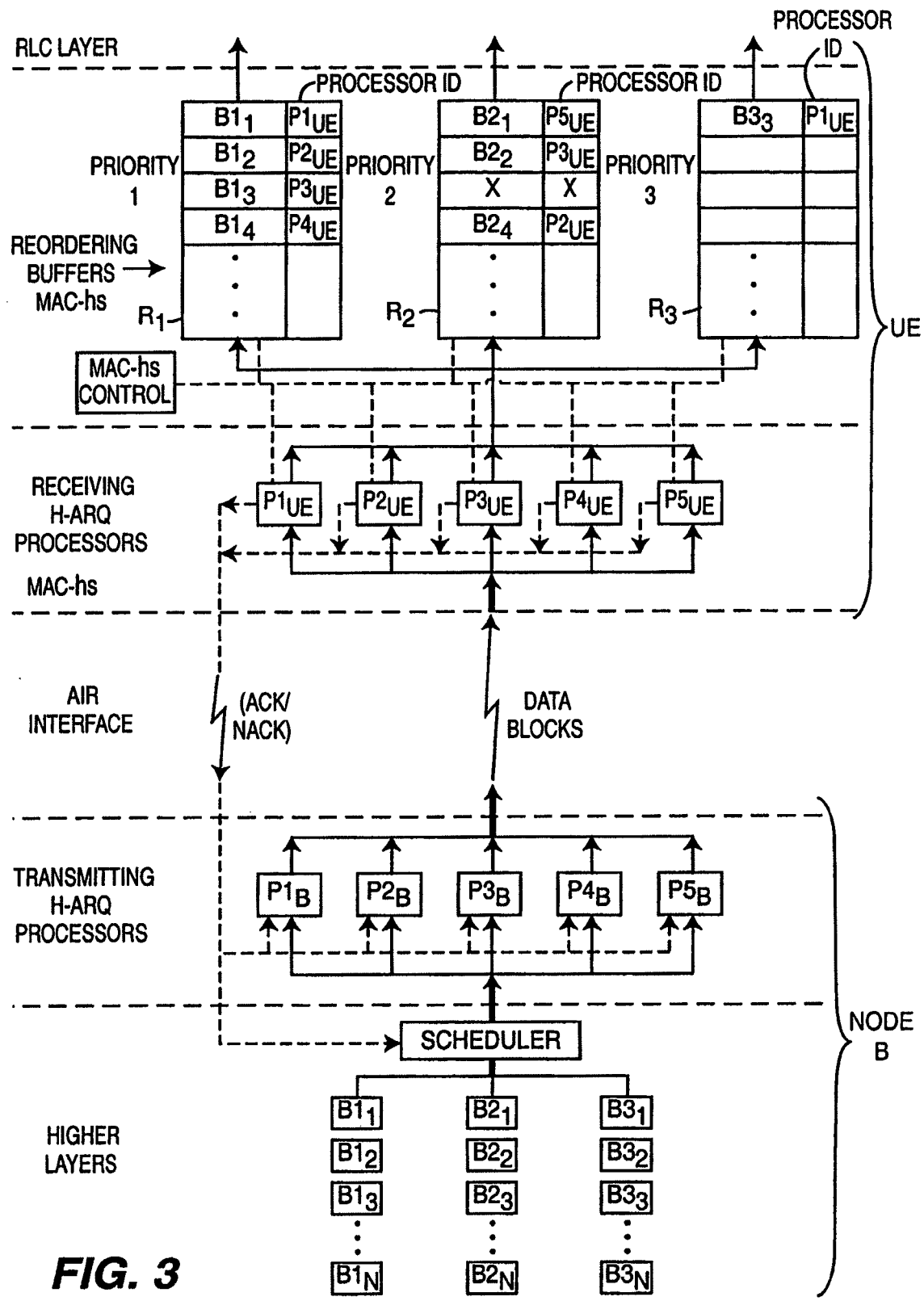
FIG. 3 is a block diagram of the data flow between a Node B and a UE.
Figure 4:
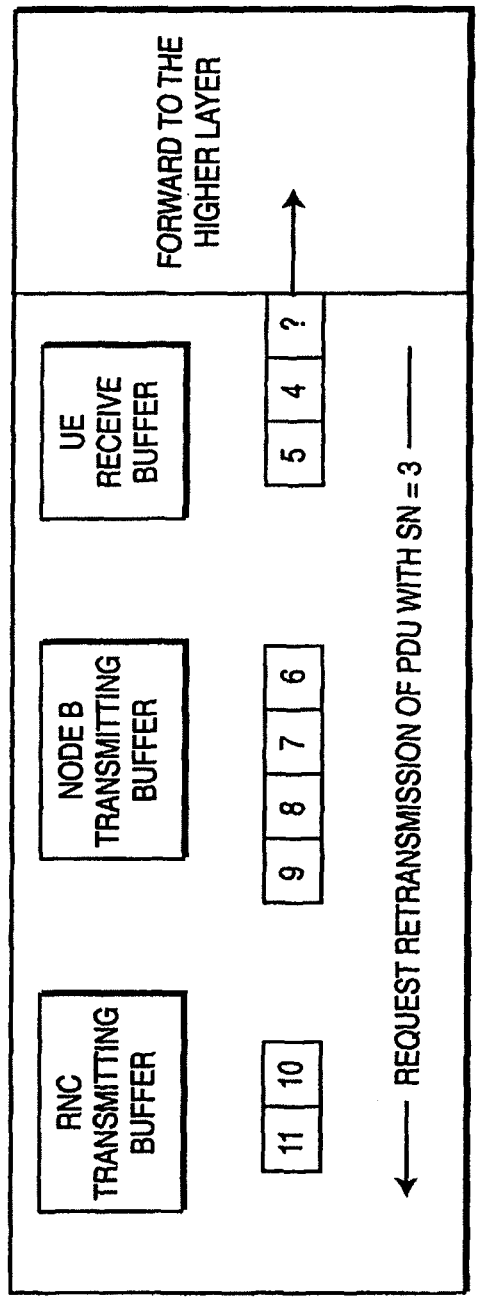
FIG. 4 is a diagram of the RLC layer exhibiting a missed PDU transmission.

The preferred embodiments will be described with reference to the drawing figures where like numerals represent like elements throughout.

In describing the present invention, reference may be made to the terminology "buffer" and "memory." It is intended that these terms are equivalent, and are used to indicate a plurality of data blocks or PDUs in a successive queue.

In order to reduce the latency of an RLC layer retransmission, the present invention prioritizes a retransmission of a PDU over a subsequent PDU in the buffer of an intermediate node, such as a Node B for example.

In the downlink direction (data transmissions from serving RNC (SRNC) to UE), one source of the latency of the retransmissions is generated in applications that buffer in the UTRAN outside of the SRNC. For example, buffering for an application could occur in the Controlling RNC (CRNC) or in the Node B. In several applications, the RNC RLC sends the PDU to the MAC-d in the RNC which creates an MAC-d PDU which is sent to the CRNC and then Node B (note that in the case that a UE has not moved out of the cell coverage of the SRNC, the CRNC will be the same RNC, and therefore, any messages sent are internal. When the UE has moved out of cell coverage of the SRNC, the new CRNC is known as the Drift RNC (DRNC). For simplification, in both cases this RNC will be referred to as a CRNC).

Since the MAC-d PDU contains exactly 1 RLC PDU (plus other potential MAC information), a MAC-d PDU can be considered equivalent to a RLC PDU. Although, discussion of PDUs in the CRNC or the Node B in the present application refers to MAC-d PDUs (not RLC PDUs), they can be considered equivalent for the purpose of the present invention and the term PDU will be used hereinafter to refer to both.

To allow for continuous data flow, the PDUs from the RNC RLC are usually queued in buffers of the CRNC or Node B for a while, before they are transmitted to the UE and thus the peer RLC. As will be described in detail hereinafter, the presently inventive method of retransmitting data at a higher priority bypasses the buffering/queuing of data in the UTRAN.

Figure 6:
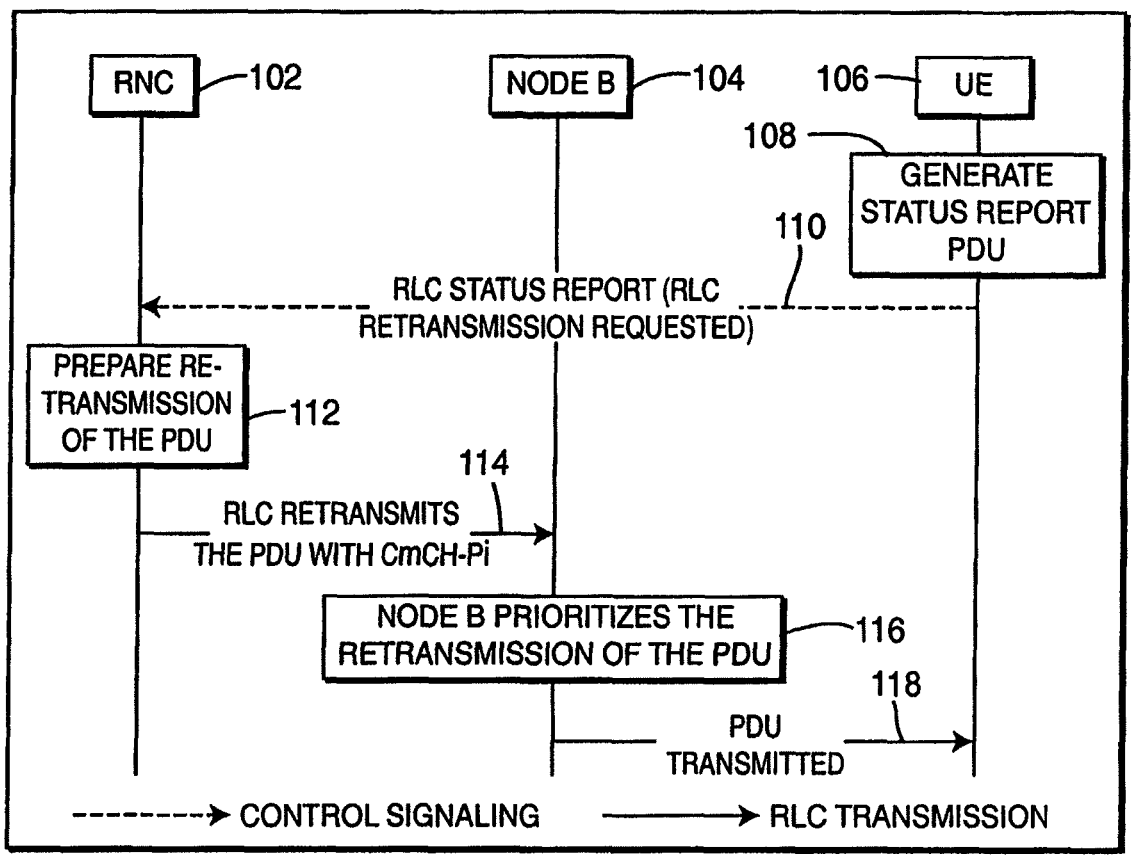
FIG. 6 is a signal diagram of a method of prioritizing retransmissions in accordance with the present invention.

One embodiment of the present invention is the RLC retransmissions from the Radio Network Controller (RNC) to the User Equipment (UE) of a system employing High Speed Downlink Packet Access (HSDPA). A method 100 for reducing the latency of retransmissions in accordance with the present invention is depicted in FIG. 6. FIG. 6 shows the communications between an RNC 102, a Node B 104 and a UE 106.

The RLC layer in the UE 106 generates a Status Report PDU (step 108) which indicates the status of received, (i.e., successfully transmitted), or missing PDUs, (i.e., unsuccessfully transmitted). This status report PDU is transmitted (step 110) to the RNC 102. Once the RLC layer in the RNC 102 receives the Status Report PDU from its peer entity in the UE 106, the RNC 102 prepares the retransmission of the missed PDU (step 112).

The present invention implements a method to enable the Node B to distinguish the retransmitted PDU from other PDUs. In a first embodiment, the RNC 102 marks the retransmitted PDU by using a field of bits on its Frame Protocol (FP) overheads. The retransmitted PDU includes a CmCH-Pi which is updated (or increased) every time the PDU is sent (step 114) from the RNC 102 to the Node B 104. This permits the Node B 104 to track the number of times the PDU is sent and, therefore, identify the proper queue in which to place the PDU. Preferably, the CmCH-Pi is typically set and updated at the RNC 102. However, this function may also be performed at the Node B 104. The Node B 104 reads the CmCH-Pi and determines the proper priority queue for the PDU (step 116). The Node B 104 transmission scheduler services the higher priority queues in advance of lower priority queues. The Node B 104 places the PDU to be retransmitted in a buffer having a higher priority than it originally had when the PDU was originally transmitted as a result of the setting of the CmCH-Pi by the RNC 102.

The PDU is then retransmitted (step 118) in a buffer (i.e., memory) having a higher priority than the priority of the original transmission. Other transmissions for this UE may be buffered in Node B 104 lower priority transmission queue at the time of the PDU retransmission. The setting of the increased CmCH-Pi for retransmitted PDUs results in transmission scheduling in advance of other PDUs previously received and buffered in Node B 104.

Figure 7:
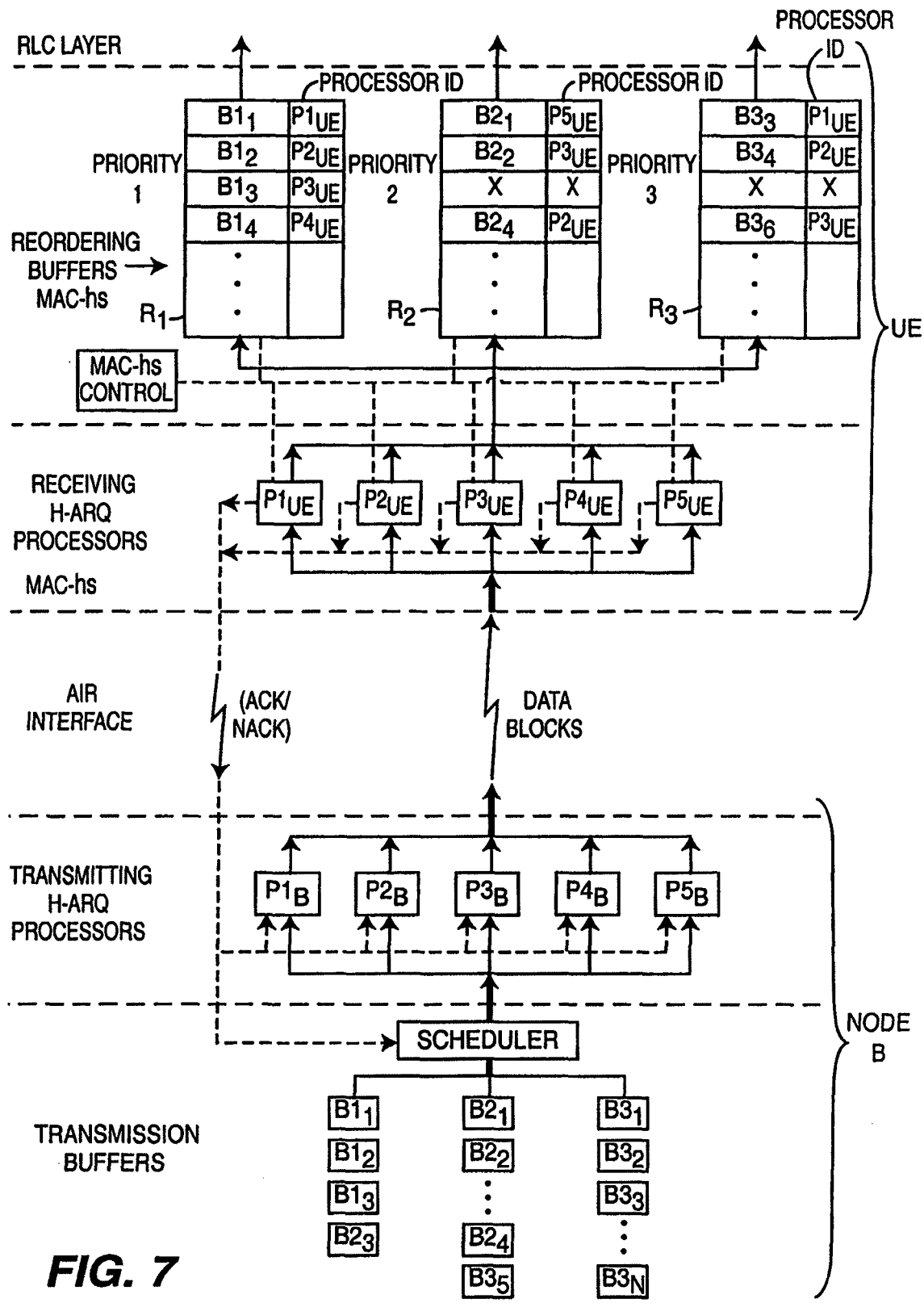
FIG. 7 is a block diagram of the data flow between a Node B and a UE, whereby retransmissions are assigned to a higher priority queue.

Referring to FIG. 7, retransmissions are assigned to a higher priority queue so that they supersede transmission of other data blocks which originate from the same "original" transmission buffer. Once the receiving H-ARQ processors $P1_{UE}$-$P5_{UE}$ process each data block, they are forwarded to the reordering buffers $R_1$, $R_2$, $R_3$ based on their priority; one reordering buffer for each priority level of data. For example, reordering buffer $R_2$ reorders data blocks $B2_1$, $B2_2$ and $B2_4$. Reordering buffer $R_3$ reorders data blocks $B3_3$, $B3_4$ and $B3_6$. A data block ("X") is missing between the data blocks $B2_2$ and $B2_4$. An additional data block ("X") is missing between the data blocks $B3_4$ and $B3_6$. Thus, expected data blocks $B2_3$ and $B3_5$ are not received, e.g., due to a NACK message being misinterpreted as being an ACK message.

The missing data blocks are then retransmitted. Normally, the data block $B2_3$ would have been placed in the Priority 2 transmission buffer. However, since the data block $B2_3$ was missed and had to be retransmitted, the data block $B2_3$ is placed in a higher priority transmission buffer, (in this case the Priority 1 transmission buffer), and thus is sent earlier than if it were placed in the Priority 2 or 3 transmission buffers. Likewise, the data block $B3_5$ would have normally been placed in the Priority 3 transmission buffer. However, since the data block $B3_5$ was missed and had to be retransmitted, the data block $B3_5$ is placed in either the Priority 1 or Priority 2 transmission buffer so that it is transmitted earlier than if it had been placed in the Priority 3 transmission buffer.

Upon reception of PDUs in the Node B, the CmCH-PI is used to determine the priority queue B1$n$-B3$n$. The scheduler services the higher priority queues first and assigns transmissions to transmitting H-ARQ processors $P1_B$-$P5_B$. Upon successful transmission to the UE, the receiving H-ARQ processors $P1_{UE}$-$P5_{UE}$ forward the retransmitted PDUs to the RLC layer.

Figure 8:
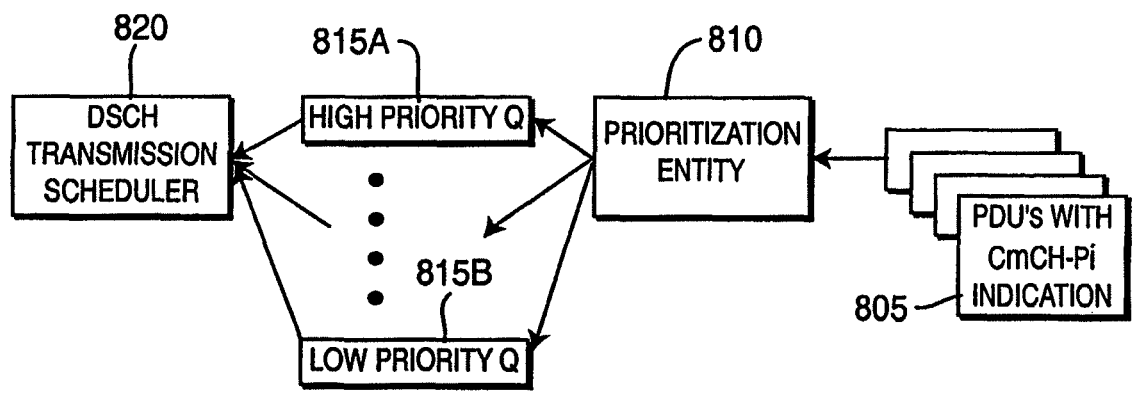
FIG. 8 is a block diagram of the data flow of a DSCH transmission scheduling PDUs with CmCH-Pi indications.

This procedure may also be applied for a DSCH system, except that the intermediate node is the CRNC instead of the Node B. Referring to FIG. 8, PDUs 805 with CmCH-Pi indications are given priority by a prioritization entity 810 and are scheduled for transmission by the MAC-sh in the CRNC. The MAC-sh maintains multiple priority queues 815A, 815B, and a DSCH transmission scheduler 820 determines which PDU 805 is to be transmitted based on the priority of that data. Therefore, by setting increased CmCH-Pi for DSCH retransmissions, these transmissions will be serviced in advance of other data for the UE. This is similar to the HS-DSCH case where the Node B MAC-hs entity schedules transmissions.

Figure 9:
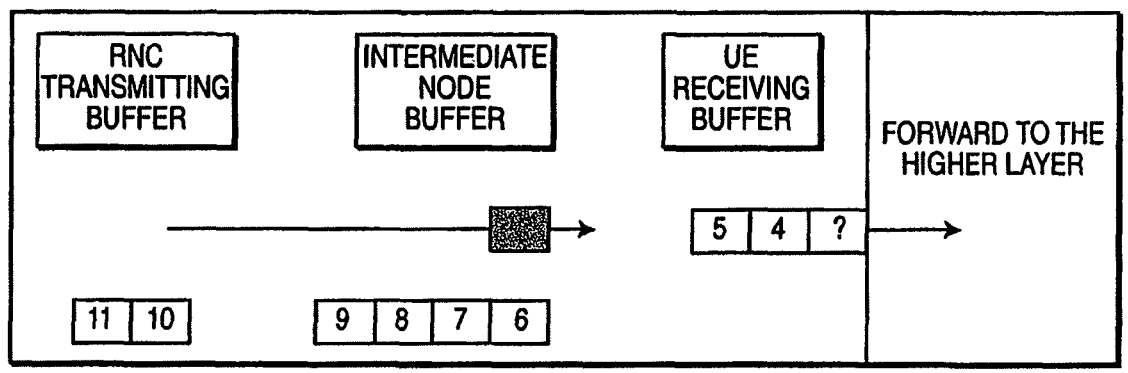
FIGS. 9 and 10 are diagrams of retransmission by the RLC layer of a missed PDU transmission in accordance with the present invention.

Referring to FIG. 9, a system is shown in accordance with the present invention implementing the prioritization method of FIG. 6. After the RLC layer in the UE transmits a status report PDU to the RLC layer in the RNC indicating that the PDU with SN=3 has not been successfully received, the RNC sends a retransmission of the PDU with SN=3. The PDU will be prioritized over other PDUs in the buffer of the intermediate node by placement within a higher priority buffer. It should be noted that although only 11 PDUs are shown, in actuality, there may be hundreds of queued PDUs.

Figure 5:
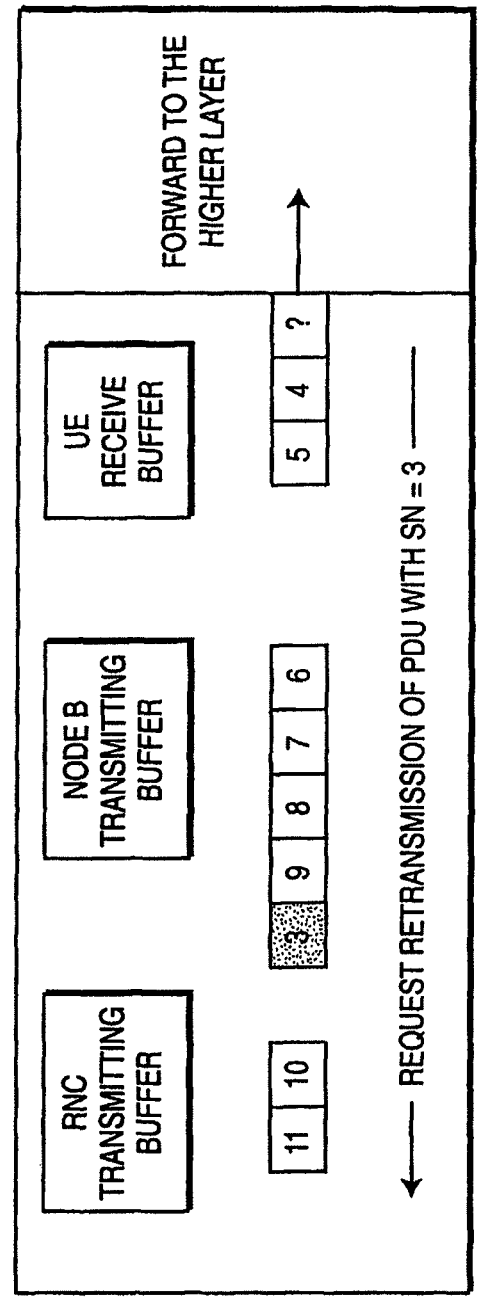
FIG. 5 is a diagram of retransmission by the RLC layer of the missed PDU transmission.
Figure 10:
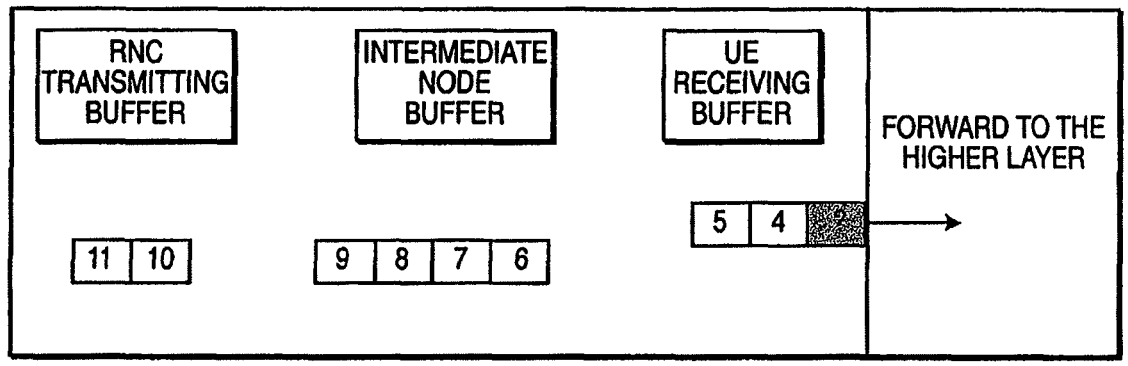

The benefits of the present invention can be seen with reference to FIG. 10, which depicts the result of the prioritization function in the receiving buffer. The retransmitted PDU with SN=3 arrives at the receiving buffer, and the in-sequence PDUs with SN=3 to 5 can be forwarded to the higher layer much more quickly than the prior art scenario depicted in FIG. 5.

While the present invention has been described in terms of the preferred embodiment, other variations which are within the scope of the invention as outlined in the claims below will be apparent to those skilled in the art.

What is claimed is:

1. A network device comprising:
    a processor configured to send, to user equipment (UE) that provides radio link control (RLC) protocol data units (PDUs) in-sequence to a higher layer function, a RLC data PDU;
    the processor is further configured to provide a MAC function to process the RLC data PDU to produce a MAC PDU to send as a data block, wherein the MAC function schedules RLC data PDUs for transmission in association with priorities;
    the processor is further configured to receive, at an RLC function, a status PDU with an indication that the RLC data PDU was not received at the UE; and
    wherein on a condition that the RLC data PDU was not received:
        a transmitter is configured to retransmit the RLC data PDU and to prioritize the retransmitted RLC data PDU over other RLC data PDUs;
    and
        the processor is further configured to track a number of times that the RLC data PDU was retransmitted.

2. The network device of claim 1 wherein:
    the retransmitted RLC data PDU is prioritized over non-retransmitted RLC data PDUs including those with higher priority than the retransmitted RLC data PDU; and
    each retransmission of the RLC data PDU is prioritized over non-retransmitted RLC PDUs.

3. The network device of claim 1, wherein the network device is one of a component of a UMTS device or a High Speed Downlink Packet Access (HSDPA) device.

4. The network device of claim 1, wherein non-retransmitted RLC data PDUs are stored in a first buffer and the retransmitted RLC data PDU is stored in a second buffer.

5. The network device of claim 1, wherein the network device is one of a radio network controller (RNC) or Node B.

6. The network device of claim 1, wherein the RLC data PDU is processed by one of a MAC-d or a MAC-hs function.

7. A method performed by a network device, the method comprising:
    sending, by the network device to user equipment (UE) that provides radio link control (RLC) protocol data units (PDUs) in-sequence to a higher layer function, a RLC data PDU;
    providing, by the network device, a MAC function to process the RLC data PDU to produce a MAC PDU to send as a data block, wherein the MAC function schedules RLC data PDUs for transmission in association with priorities;
    receiving, by the network device at an RLC function, a status PDU with an indication that the RLC data PDU was not received at the UE; and
    wherein on a condition that the RLC data PDU was not received:
        retransmitting, by the network device, the RLC data PDU and prioritizing the retransmitted RLC data PDU over other RLC data PDUs;
    and
        tracking, by the network device, a number of times that the RLC data PDU was retransmitted.

8. The method of claim 7 wherein:
    the retransmitted RLC data PDU is prioritized over non-retransmitted RLC data PDUs including those with higher priority than the retransmitted RLC data PDU; and
    each retransmission of the RLC data PDU is prioritized over non-retransmitted RLC PDUs.

9. The method of claim 7, wherein the network device is one of a component of a UMTS device or a High Speed Downlink Packet Access (HSDPA) device.

10. The method of claim 7, wherein non-retransmitted RLC data PDUs are stored in a first buffer and the retransmitted RLC data PDU is stored in a second buffer.

11. The method of claim 7, wherein the network device is one of a radio network controller (RNC) or Node B.

12. The method of claim 7, wherein the RLC data PDU is processed by one of a MAC-d or a MAC-hs function.

13. A user equipment (UE) comprising:
    a processor configured to send, to a network device that provides radio link control (RLC) protocol data units (PDUs) in-sequence to a higher layer function, a RLC data PDU;
    the processor is further configured to provide a MAC function to process the RLC data PDU to produce a MAC PDU to send as a data block, wherein the MAC function schedules RLC data PDUs for transmission in association with priorities;
    the processor is further configured to receive, at an RLC function, a status PDU with an indication that the RLC data PDU was not received at the network device; and
    wherein on a condition that the RLC data PDU was not received:

a transmitter is configured to retransmit the RLC data PDU and to prioritize the retransmitted RLC data PDU over other RLC data PDUs; and the processor is further configured to track a number of times that the RLC data PDU was retransmitted.

14. The UE of claim 13 wherein:

the retransmitted RLC data PDU is prioritized over non-retransmitted RLC data PDUs including those with higher priority than the retransmitted RLC data PDU; and each retransmission of the RLC data PDU is prioritized over non-retransmitted RLC PDUs.

15. The UE of claim 13, wherein the UE is one of a component of a UMTS device or a High Speed Downlink Packet Access (HSDPA) device.

16. The UE of claim 13, wherein non-retransmitted RLC data PDUs are stored in a first buffer and the retransmitted RLC data PDU is stored in a second buffer.

17. The UE of claim 13, wherein the RLC data PDU is processed by one of a MAC-d or a MAC-hs function.

18. A method performed by user equipment (UE), the method comprising:

sending, by the UE to a network device that provides radio link control (RLC) protocol data units (PDUs) in-sequence to a higher layer function, a RLC data PDU;

providing, by the UE, a MAC function to process the RLC data PDU to produce a MAC PDU to send as a data block, wherein the MAC function schedules RLC data PDUs for transmission in association with priorities;

receiving, by the UE at an RLC function, a status PDU with an indication that the RLC data PDU was not received at the network device; and wherein on a condition that the RLC data PDU was not received:

retransmitting, by the UE, the RLC data PDU and prioritizing the retransmitted RLC data PDU over other RLC data PDUs;

and tracking, by the UE, a number of times that the RLC data PDU was retransmitted.

19. The method of claim 18 wherein:

the retransmitted RLC data PDU is prioritized over non-retransmitted RLC data PDUs including those with higher priority than the retransmitted RLC data PDU; and each retransmission of the RLC data PDU is prioritized over non-retransmitted RLC PDUs.

20. The method of claim 18, wherein the UE is one of a component of a UMTS device or a High Speed Downlink Packet Access (HSDPA) device.

21. The method of claim 18, wherein non-retransmitted RLC data PDUs are stored in a first buffer and the retransmitted RLC data PDU is stored in a second buffer.

22. The method of claim 18, wherein the RLC data PDU is processed by one of a MAC-d or a MAC-hs function.

* * * * *